United States Patent [19]

Tatekura et al.

[11] Patent Number: 4,506,947
[45] Date of Patent: Mar. 26, 1985

[54] METHOD AND APPARATUS FOR CORE ALIGNMENT OF OPTICAL FIBERS

[75] Inventors: Koichi Tatekura; Hitoshi Yamamoto; Makoto Nunokawa; Yoshihiro Ejiri, all of Tokyo, Japan

[73] Assignee: Kokusai Denshin Denwa Kabushiki Kaisha, Tokyo, Japan

[21] Appl. No.: 438,821

[22] Filed: Nov. 3, 1982

[30] Foreign Application Priority Data

Nov. 18, 1981 [JP] Japan .............................. 56-183868

[51] Int. Cl.³ .............................................. G02B 7/26
[52] U.S. Cl. ............................. 350/96.21; 350/96.20; 356/73.1
[58] Field of Search ................... 350/1.1, 320, 96.20, 350/96.21, 96.22; 356/73.1, 153; 250/461.1

[56] References Cited
U.S. PATENT DOCUMENTS 4,362,943 12/1982 Presby .............................. 356/73.1

Primary Examiner—William L. Sikes
Assistant Examiner—Akm E. Ullah
Attorney, Agent, or Firm—Pollock, Vande Sande and Priddy

[57] ABSTRACT

In the connection of the opposed ends of two optical fibers, a method and apparatus for core alignment of the optical fibers, comprises placing the two optical fibers being connected so that their ends face each other, and illuminating at least the facing ends with a beam of ultraviolet light thereby causing the illuminated ends of the cores of the optical fibers which are doped with germanium (Ge) to emit light of a wavelength in the visible region and enabling the core alignment to be directly monitored visually with the aid of the visible light so emitted from the cores during the course of the core alignment.

6 Claims, 3 Drawing Figures

METHOD AND APPARATUS FOR CORE ALIGNMENT OF OPTICAL FIBERS

BACKGROUND OF THE INVENTION

1. Field of the Invention

This invention relates to a method and an apparatus for core alignment of two optical fibers to be spliced or connected.

2. Description of the Prior Art

Because of their wide band and low loss, optical fibers can be advantageously used as transmission medium in a non-repeated long-haul transmission system covering a distance of the order of some tens of kilometers. At present, the optical fibers which suit actual service generally have a maximum length of about 10 kilometers beause of the restriction associated with equipment available for optical fiber manufacture. To prepare continuous optical fibers extending over the distance of some tens of kilometers, therefore, it becomes necessary to splice currently available optical fibers end to end. The connection of optical fibers is also necessary since optical fibers, when severed accidentally or otherwise, must be spliced together.

When connecting two optical fibers, efforts should be made to repress possible loss due to the work of connection as much as possible to ensure full utility of the characteristic low loss inherent in optical fibers. The degree of the loss due to the connection to two optical fibers is essentially determined by the amount of deviation (misalignment) between the centers of the cores of the optical fibers at their spliced ends. To obtain desired connection of two optical fibers with very low loss, therefore, it becomes necessary to minimize the amount of misalignment between the connected core ends of the optical fibers. The particular work involved for this purpose is generally referred to as "core alignment."

The principle which underlies the conventional method for core alignment is depicted in FIG. 1. One of the two optical fibers 11 to be connected is fastened to a stationary stage 13 and the other optical fiber 12 is fastened to a stage 14 finely movable in the directions x, y, and z as illustrated. The output light from a light source 15 is injected into the fiber 11. The incident light passes through the fiber 11 and the fiber 12 and reaches the optical detector 16. Then, required core alignment is effected by monitoring the optical power transmitted to the optical detector 16 and, at the same time, moving the stage 14 to a point at which the optical power displayed on the optical detector 16 reaches its maximum. This method is referred to as the method of monitoring be means of transmitted optical power.

This method, however, suffers from two major drawbacks.

One of the drawbacks is that a place for connection (a position at which the stages 13 and 14 are located), a place for incidence of light (a position at which the light source 15 is located), and a place for reception of the transmitted light (a position at which the optical detector 16 is located) are different. When cables using optical fibers as transmission medium are sequentially connected and laid over a great distance or when such cables have sustained breakage, for example, there is a possibility that the actual spots for the connection of optical fibers will be separated by tens to some hundreds of kilometers from the repeater station. In this case, the method entails grave inconvenience in that the transmitted optical power is monitored at the repeater station and the actual core alignment for the connection of optical fibers is carried out at a distant field. Ideally this method ought to be modified so that the core alignment at the site of the connection of optical fibers may be effectively carried out based on the information obtainable in the field (or at the site) of the core alignment. The aforementioned conventional method is incapable of any such modification.

The other drawback is that there are cases where the method of monitoring by means of transmitted optical power cannot be put to effect. In the case of a repeated setup incorporating a plurality of repeaters, the situation in which all the repeaters are operated and the optical power transmitted through them all is monitored is not improbable. In that case, the output power is fixed at a constant level by the automatic gain controllers (AGC) in the repeaters, irrespectively of the level of the input optical power to the repeaters. Consequently, the level of the optical power to the optical detector 16 does not include the information on the state of connection. Thus, the method of monitoring by means of the transmitted optical power can no longer be effectively adopted.

SUMMARY OF THE INVENTION

An object of this invention is to provide a method and an apparatus which enable the core alignment for the connection of two optical fibers to be carried out on the basis of the information obtained and by the use of the apparatus installed both in the place (or at the actual site) where fibers are spliced without entailing any of the aforementioned drawbacks suffered by the conventional method.

This invention is characterized by putting the two optical fibers being connected so that the ends to be joined face each other, and illuminating at least the said facing ends with an ultraviolet light thereby causing the fluorescence of the cores of the optical fibers which are doped with germanium (Ge) to emit visible light and enabling the core to be directly monitored visually with the aid of the visible light so emitted from the cores during the course of the core alignment.

DETAILED DESCRIPTION OF THE INVENTION

Figure 2:
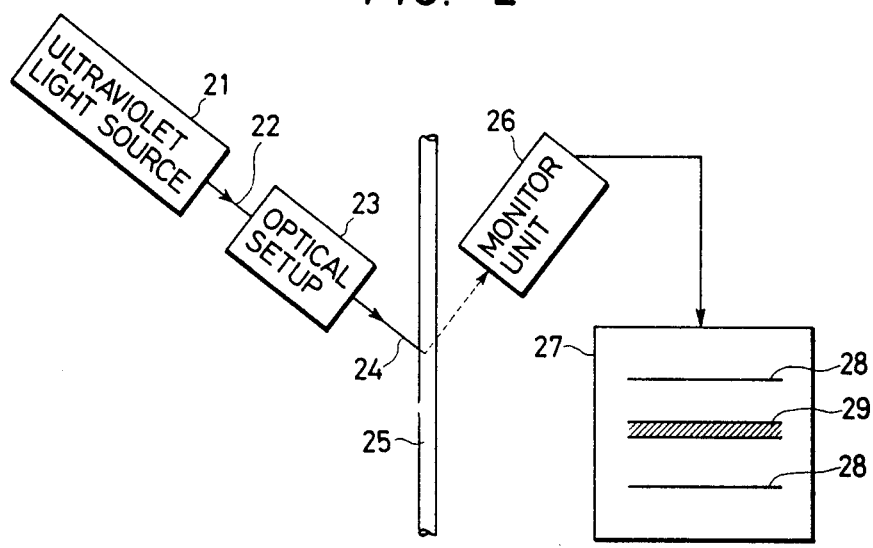
FIG. 2 is a schematic diagram illustrating the principle which underlies the method of this invention for core alignment by the aid of the luminescence of cores of the optical fibers being connected.

Now, the present invention will be described in detail below with reference to the accompanying drawing. FIG 2. is a schematic diagram illustrating the principle which underlies the method of the present invention. In this diagram, 21 denotes an ultraviolet light source for emitting ultraviolet light such as a mercury-vapor lamp or a He-Cd (helium-cadmium) laser, 22 represents the ultraviolet light emitted from the ultraviolet light source 21, 23 is an optical setup for focusing the ultraviolet light 22, 24 is the ultraviolet light so focused into a beam, 25 is an optical fiber containing germanium (Ge)

as a dopant, 26 is a monitor device for the observation of the appearance assumed by the optical fiber 25 being illuminated by the ultraviolet light 24, 27 is a display unit for displaying the output of the monitor, and 28 and 29 respectively represent the monitor outputs of the cladding and the core of the optical fiber 25.

In the apparatus constructed as described above, the ultraviolet light 22 emitted from the ultraviolet light source 21 is beam of by the optical setup 23 and the focused ultraviolet light 24 impinges upon the optical fiber 25. The manner in which the optical fiber 25 is illuminated with the aforementioned ultraviolet light 24 is observed by the use of the monitor unit 26. The consequent output of the monitor 26 is displayed on the monitor output display unit 27. The observation of the monitor output on the display unit permits discrimination between the cladding and the core of the optical fiber. This invention makes use of this principle.

Now, the reason for the discrimination effectively obtainable as described above between the monitor output 29 of the core and the monitor output of the cladding will be described below. Generally silica glass of extremely high purity containing Ge as an impurity may as well be regarded as a fluorescent substance and, therefore, emits a light of a wavelength in the visible region when it is excited by an ultraviolet light. In this phenomenon, since Ge constitutes the luminous material, silica glass itself does not emit any light. Emission of a blue light, therefore, is observed only where Ge is present. Incidentally, the recent low-loss optical fibers are produced by using Ge as a dopant in their cores. The choice of Ge in particular is because Ge is a substance which avoids causing any loss even in the long wavelength region and because it is suitable as an impurity for heightening the refractive index of cores.

The illumination of these optical fibers by the ultraviolet light, therefore, results in the fluorescence of the cores in a blue color. On the other hand, since the cladding of the optical fibers do not contain any Ge and, therefore, do not luminesce, the cores forming the centers of the optical fibers alone are observed prominently.

On the monitor output display unit 27, the monitor output 28 of the cladding of the optical fiber is observed because the impinging ultraviolet light is reflected on the surface of the clad coat. When a filter capable of intercepting ultraviolet light is interposed between the optical fiber 25 and the monitor device 26, therefore, the monitor output of the cladding of the optical fiber disappears and only the monitor output 29 of the core is directly observed.

Since exclusive monitoring of the core of the optical fiber can be obtained by utilizing the characteristic behavior as a fluorescent substance of the optical fiber doped with Ge as described above, desired alignment of the cores of two optical fibers can be effected without being obstructed by the cladding wrapped round the cores.

Figure 3:
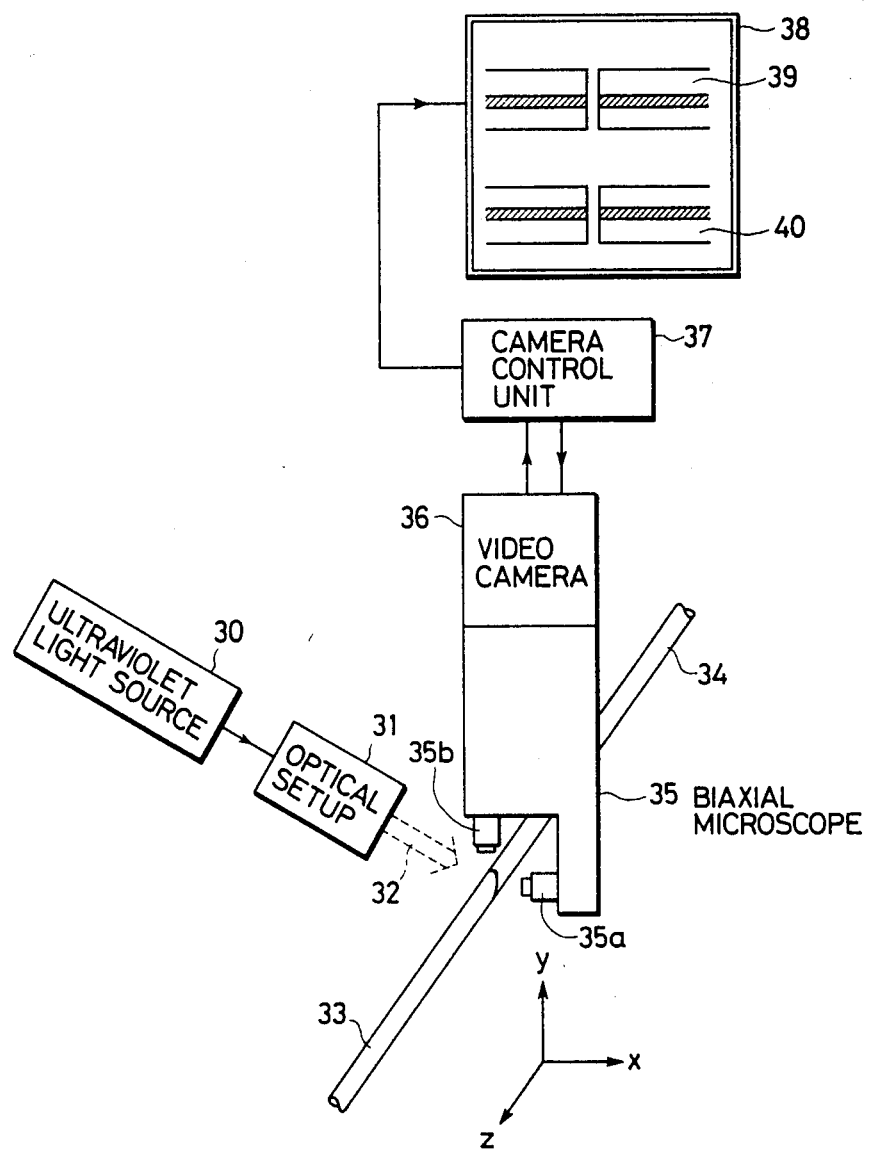
FIG. 3 is a schematic structural diagram illustrating one preferred embodiment of the method of this invention for core alignment.

Now, one preferred embodiment of the method of this invention for core alignment and a typical apparatus to be used for core alignment in accordance with the preferred embodiment will be described below with reference to FIG. 3.

Figure 1:
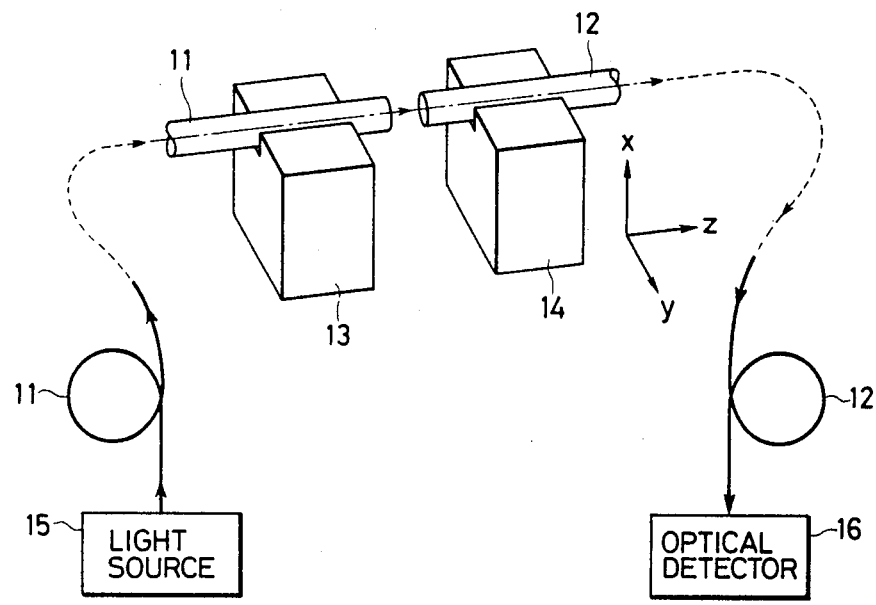
FIG. 1 is a schematic diagram illustrating the construction of a conventional device for core alignment.

In the diagram, 30 denotes an ultraviolet light source such as a mercury-vapor lamp or a He-Cd laser, 31 is an optical setup for focusing the ultraviolet light emitted from the ultraviolet light source 30, 32 represents the beam of ultraviolet light focused by the optical setup 31, 33 and 34 are the optical fibers being connected, 35 is a biaxial (x axis and y axis) microscope, 35a is an object lens which views the two fibers in the direction of the x axis, 35b is an object lens which views the two fibers in the direction of the y axis, 36 is a video camera, 37 is a camera control unit, 38 is a monitor television, and 39 and 40 are monitor outputs shown in the monitor television 38 representing luminance brightness distributions at the point of splice of optical fibers as viewed in the directions of the x axis and the y axis respectively. It is assumed herein that the optical fibers 33 and 34 are fastened to fiber supporting stages of the type shown at 13 and 14 in FIG. 1, and that at least one of said stages is movable in the directions of x, y, and z axes illustrated in FIG. 3. The camera control unit 37 is capable of controlling the magnitude of the scanning current for the video camera 36 and designating the address of scanning beam, etc.

First, the optical fibers 33, 34 to be spliced are laid in the direction of the z axis shown in the diagram. Then, the ultraviolet light source 30 is actuated to emit the ultraviolet light. The ultraviolet light emitted from the ultraviolet light source 30 is focused into a beam by the optical setup 31. The beam of ultraviolet light 32 illuminates the point of splice of the two optical fibers 33, 34 and its vicinity. This illumination causes the Ge-containing cores of the optical fibers to luminesce. At this time, the light emitted by the cores is observed by the biaxial microscope 35, the video camera 36, the camera control unit 37, and the monitor television 38. Consequently the monitor outputs 39, 40 representing the luminance brightness distributions at the point of splice of the optical fibers respectively in the directions of the x axis and the y axis are shown in the monitor television 38. Thus, required core alignment of the optical fibers can be effected by finely moving the stage supporting the optical fibers 33, 34 in the directions of the x and y axes so that the images of the cores in the monitor outputs 39, 40 are brought into accurate alignment while keeping under close observation the monitor outputs 39, 40.

The accuracy of this core alignment can be improved by providing a slicing function capable of converting a luminance brightness distribution into binary values (white and black), a sampling line function capable of setting at least one reference line at a desired position in the screen and permitting observation of deviation of the core images from the reference line, etc. as supplements for the video device which monitors the phenomenon of luminescence of optical fiber cores due to the excitation with the ultraviolet light. Video devices possessed of such functions are commercially available and are well known in the art.

When the core and cladding of the optical fiber are eccentric, the light emitted outwardly from the cores, is slightly refracted owing to the lens effect produced in the boundary between the cladding and the air. Consequently, the positions of the cores observed from outside the optical fibers are slightly deviated from the true positions of the cores. In the core alignment which is solely directed to comparing the relative positions of the cores of two optical fibers, however, the possible effect of the aforementioned deviation of the core positions is notably alleviated by making the observation in the direction of the two axes as mentioned above. This effect of the deviation is eliminated substantially by making the observation in the two perpendicularly intersecting directions as illustrated in FIG. 3.

As described in detail above, the present invention produces a striking effect of enabling the core alignment indispensable to accurate connection of two optical fibers to be carried out on the basis of the information obtained and by the use of apparatus installed both in the place (or at the spot) where fibers are spliced. It further produces an effect of providing highly reliable core alignment because this core alignment depends solely on the monitoring of the core ends facing each other of the optical fibers.

What is claimed is:

1. A method of aligning two optical fibers in the splicing of said fibers, each of said fibers comprising an elongated core having a dopant therein which causes the core to fluoresce and emit light of a wavelength in the visible region when illuminated with ultraviolet light, and each of said fibers further comprising an undoped cladding material surrounding said core which does not so fluoresce when illuminated with ultraviolet light, said method comprising the steps of positioning said two fibers so that the free ends of the fibers to be spliced are disposed in closely adjacent facing relation to one another, projecting ultraviolet light onto both of said fibers to illuminate the complete cross section of the cores as well as the surrounding cladding material of both of said fibers, simultaneously visually monitoring the free ends of both of said two fibers by use of the visible light that is emitted by the cores of said fibers to determine the positions of said free ends relative to one another, and moving at least one of said free ends of said two optical fibers while effecting said simultaneous visual monitoring step to bring the cores of said two fibers into accurate alignment with one another.

2. The method of claim 1 wherein said simultaneous visual monitoring step comprises simultaneously observing the relative positions of said free ends of said fibers along two different directions which are disposed in intersecting relation to one another.

3. The method of claim 2 wherein said two different directions of observation are perpendicular to one another.

4. The method of claim 2 wherein said simultaneous visual monitoring step is effected along said two intersecting directions of observation by use of a biaxial microscope which provides magnified images of the relative positions of said free ends in each of said two directions.

5. The method of claim 4 wherein said visual monitoring step includes the step of viewing said magnified images by means of a video camera the output of which is supplied to a video monitor, the video monitor providing video images of the cores and cladding material of the closely adjacent free ends of both said optical fibers as observed along both of said two directions of observation.

6. An apparatus for aligning two optical fibers in the splicing of said fibers, each of said fibers comprising an elongated core having a dopant therein which causes the core to fluoresce and emit visible light when the core is illuminated with ultraviolet light, and each of said fibers further comprising an undoped cladding material surrounding said core which cladding material does not so fluoresce when illuminated with ultraviolet light, said apparatus comprising a pair of support stages for respectively supporting the two fibers to be spliced in general alignment with one another with the ends of the fibers that are to be joined together being disposed in closely adjacent facing relation to one another, said pair of support stages being movable relative to one another to adjust the alignment of said two fibers, a source of ultraviolet light, optical means between said source and said fibers for producing a beam of ultraviolet light which illuminates the complete cross section of the core as well as the surrounding cladding material of each of said fibers adjacent at least said facing ends of said fibers, a biaxial microscope responsive to the visible light emitted by said illuminated fibers for producing simultaneous magnified images of the closely adjacent fiber ends along two directions of observation that are perpendicular to one another, a video camera coupled to said microscope for producing signals representative of said magnified images, and a video monitor coupled to said camera for simultaneously producing a pair of video images, representative respectively of the cores and cladding material of the adjacent ends of said fibers as observed along said two directions of observation, for use in varying the positions of said support stages relative to one another so as to permit the fibers to be spliced to be brought into accurate alignment with one another.

* * * * *